United States Patent
Maccaglia et al.

(10) Patent No.: US 10,931,369 B2
(45) Date of Patent: *Feb. 23, 2021

(54) METHODS AND APPARATUS FOR ADAPTIVELY DETECTING SIGNAL DEGRADATION IN AN OPTICAL COMMUNICATION SYSTEM USING THE PRE-FORWARD ERROR CORRECTION BIT ERROR RATE

(71) Applicant: Juniper Networks, Inc., Sunnyvale, CA (US)

(72) Inventors: Remo Maccaglia, Rome (IT); Gert Grammel, Ditzingen (DE)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/829,360

(22) Filed: Mar. 25, 2020

(65) Prior Publication Data

US 2020/0228200 A1 Jul. 16, 2020

Related U.S. Application Data

(63) Continuation of application No. 16/175,469, filed on Oct. 30, 2018, now Pat. No. 10,644,792.

(Continued)

(51) Int. Cl.
*H04B 10/079* (2013.01)
*H04L 1/00* (2006.01)
(Continued)

(52) U.S. Cl.
CPC ....... *H04B 10/07953* (2013.01); *G06N 20/00* (2019.01); *H04B 10/038* (2013.01);
(Continued)

(58) Field of Classification Search
CPC ........ H04B 10/07953; H04B 10/07955; H04B 10/0799; H04B 10/079; H04B 10/038;
(Continued)

(56) References Cited

U.S. PATENT DOCUMENTS 7,724,676 B2  5/2010  Gerstel et al.
7,788,547 B1  8/2010  Oliva et al.
(Continued)

FOREIGN PATENT DOCUMENTS

WO   WO 2015/103534   7/2015

OTHER PUBLICATIONS

Extended European Search Report for European Application No. 19183135.3, dated Dec. 16, 2019, 8 pages.

*Primary Examiner* — Leslie C Pascal
(74) *Attorney, Agent, or Firm* — Cooley LLP (57) ABSTRACT

In some embodiments, an apparatus comprises a memory and a processor operatively coupled to the memory. The processor is configured to receive, from a forward error correction (FEC) decoder of an optical transponder, a first plurality of pre-FEC bit error rate (BER) values at a plurality of times to identify a degradation over a first transmission path. The processor is configured to determine, based on the first plurality of pre-FEC BER values, a signal pattern. The processor is configured to adjust, based on the signal pattern, a set of parameters including a first threshold and a second threshold. The processor is configured to send, in response to a second pre-FEC BER value exceeding the second threshold and being below the first threshold, a signal to trigger traffic rerouting to a second transmission path to reduce traffic loss due to the degradation over the first transmission path.

20 Claims, 5 Drawing Sheets

Related U.S. Application Data (60) Provisional application No. 62/698,868, filed on Jul. 16, 2018.

(51) Int. Cl.

| | |
|---|---|
| H04L 1/20 | (2006.01) |
| H04J 14/02 | (2006.01) |
| H04L 12/707 | (2013.01) |
| H04L 12/24 | (2006.01) |
| H04L 12/26 | (2006.01) |
| G06N 20/00 | (2019.01) |
| H04L 12/703 | (2013.01) |
| H04B 10/038 | (2013.01) |

(52) U.S. Cl.
CPC ....... *H04B 10/079* (2013.01); *H04B 10/0799* (2013.01); *H04B 10/07955* (2013.01); *H04J 14/0271* (2013.01); *H04L 1/0026* (2013.01); *H04L 1/0045* (2013.01); *H04L 1/203* (2013.01); *H04L 41/0816* (2013.01); *H04L 43/0847* (2013.01); *H04L 43/16* (2013.01); *H04L 45/22* (2013.01); *H04L 45/28* (2013.01)

(58) Field of Classification Search
CPC ..... H04L 1/203; H04L 1/0026; H04L 1/0045; H04L 45/22; H04L 41/0816; H04L 43/0847; H04L 43/16; H04L 45/28; H04J 14/0271; G06N 20/00

See application file for complete search history.

(56) References Cited

U.S. PATENT DOCUMENTS

| | | |
|---|---|---|
| 2002/0138796 A1 | 9/2002 | Jacob |
| 2008/0232244 A1 | 9/2008 | Gerstel et al. |
| 2011/0182574 A1 | 7/2011 | Peng |
| 2018/0220210 A1 | 8/2018 | Paraschis et al. |

METHODS AND APPARATUS FOR ADAPTIVELY DETECTING SIGNAL DEGRADATION IN AN OPTICAL COMMUNICATION SYSTEM USING THE PRE-FORWARD ERROR CORRECTION BIT ERROR RATE

CROSS-REFERENCE TO RELATED APPLICATION

This application is a continuation of U.S. patent application Ser. No. 16/175,469, now U.S. Pat. No. 10,644,792, filed on Oct. 30, 2018, and entitled "Methods and Apparatus for Adaptively Detecting Signal Degradation in an Optical Communication System Using the Pre-Forward Error Correction Bit Error Rate," which is a non-provisional of and claims priority under 35 U.S.C. § 119 to U.S. provisional application Ser. No. 62/698,868, filed on Jul. 16, 2018, and entitled "Methods and Apparatus for Adaptively Detecting Signal Degradation in an Optical Communication System Using the Pre-Forward Error Correction Bit Error Rate," the disclosures of each of which are incorporated herein by reference in their entireties.

BACKGROUND

Some embodiments described herein relate generally to methods and apparatus for detecting signal degradation in an optical communication system. In particular, but not by way of limitation, some embodiments described herein relate to methods and apparatus for adaptively detecting signal degradation in an optical communication system using the pre-forward error correction (pre-FEC) bit error rate (BER).

With a growing demand of optical communication systems with high data rates capability, it is important to promptly detect and notify of signal degradation and failures to satisfy the latency, reliability, and availability requirements of these optical communication systems, which include optical transponders and routers. When the signal degradation exceeds given criteria, protection mechanisms are reduced or triggered to prevent traffic loss. Such criteria can be different for different optical communication systems, and can change over time for a given optical communication system.

Accordingly, a need exists for methods and apparatus to preventively detect signal degradation in an optical communication system before a failure occurs, and adaptively determine the criteria to trigger protection mechanisms and avoid or minimize traffic loss.

SUMMARY

In some embodiments, an apparatus comprises a memory and a processor operatively coupled to the memory. The processor is configured to receive, from a forward error correction (FEC) decoder of an optical transponder, a first plurality of pre-FEC bit error rate (BER) values at a plurality of times to identify a degradation over a first transmission path that includes the optical transponder. The processor is configured to determine, based on the first plurality of pre-FEC BER values at the plurality of times, a signal pattern. The processor is configured to adjust, based on the signal pattern, a set of parameters including a first threshold and a second threshold. The processor is configured to send, in response to a second pre-FEC BER value exceeding the second threshold and being below the first threshold, a signal to trigger traffic rerouting to a second transmission path to reduce traffic loss due to the degradation over the first transmission path.

DETAILED DESCRIPTION

In some embodiments, an apparatus comprises a memory and a processor operatively coupled to the memory. The processor is configured to receive, from a forward error correction (FEC) decoder of an optical transponder, a first plurality of pre-FEC bit error rate (BER) values at a plurality of times to identify a degradation over a first transmission path that includes the optical transponder. The processor is configured to determine, based on the first plurality of pre-FEC BER values at the plurality of times, a signal pattern. The processor is configured to adjust, based on the signal pattern, a set of parameters including a first threshold and a second threshold. The processor is configured to send, in response to a second pre-FEC BER value exceeding the second threshold and being below the first threshold, a signal to trigger traffic rerouting to a second transmission path to reduce traffic loss due to the degradation over the first transmission path.

As used in this specification, the singular forms "a," "an" and "the" include plural referents unless the context clearly dictates otherwise. Thus, for example, the term "an optical link" is intended to mean a single optical link or multiple optical links. For another example, the term "a time period" is intended to mean a single time period or multiple time periods.

Figure 1:
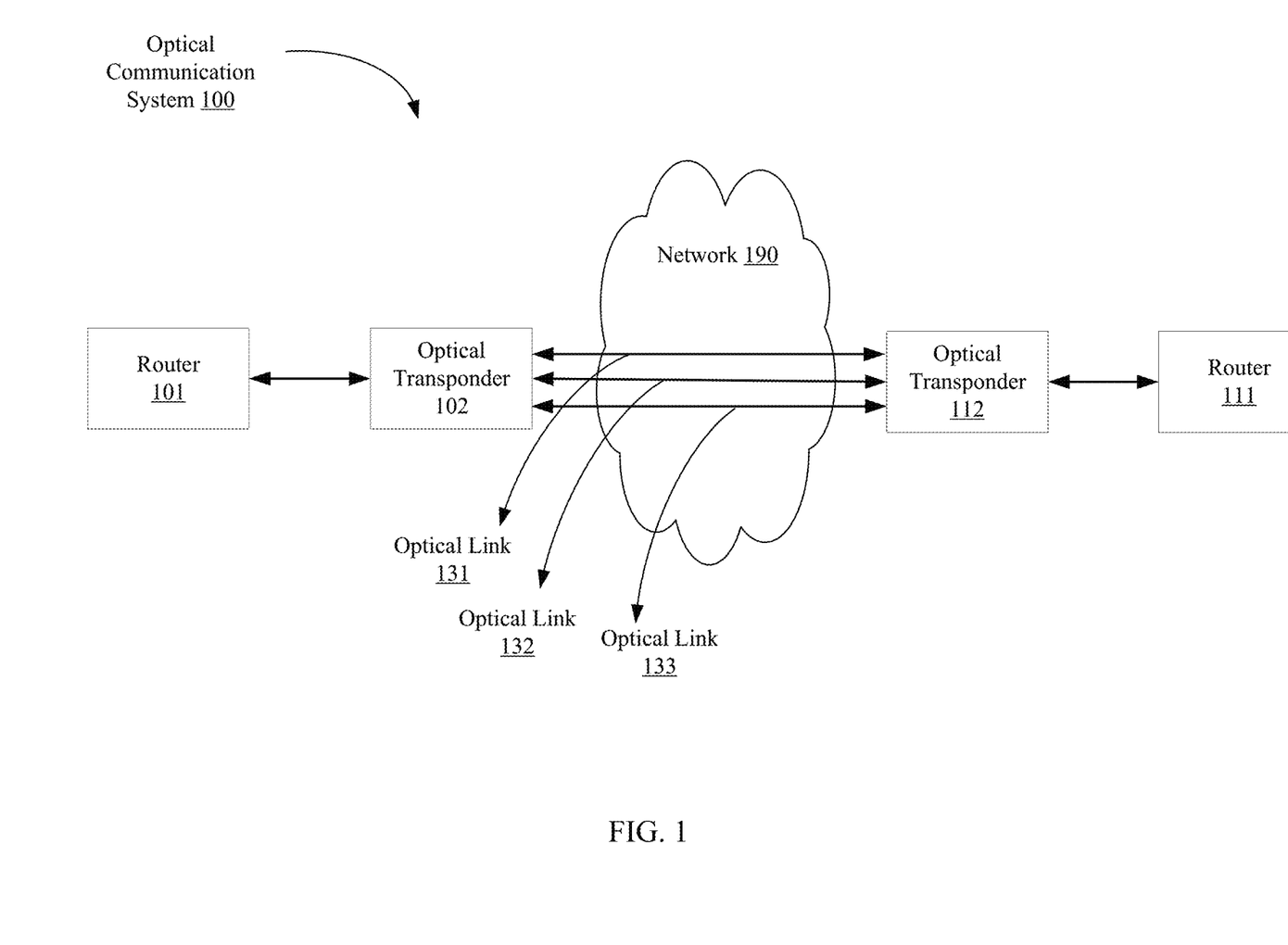
FIG. 1 is a block diagram illustrating an optical communication system, according to an embodiment.

FIG. 1 is a block diagram illustrating an optical communication system, according to an embodiment. The optical communication system 100 can be configured to produce, transmit, and/or receive electrical and optical signals. For example, the optical communication system 100 can be a wavelength division multiplexing (WDM) system, including a dense wavelength division multiplexing (DWDM) system. The optical communication system 100 can include routers 101 and 111, optical transponders 102 and 112, a network 190, and a set of optical links 131-133.

The router 101 can be operatively coupled to the optical transponder 102. The router 111 can be operatively coupled to the optical transponder 112. The router 101 and the router 111 can be structurally and/or functionally similar. The router 101 (and the router 111) can include general-purpose computational engines that can include, for example, processors, memory, and/or one or more network interface devices (e.g., a network interface card (NIC)). The router 101 (and the router 111) can also include, for example, a field-programmable gate array (FPGA), an application specific integrated circuit (ASIC), a combination thereof, or other equivalent integrated or discrete logic circuitry. The router 101 (and the router 111) can be a networking device(s) configured to connect at least a portion of a switch fabric system (e.g., a data center or compute devices within the data center; not shown in the figure) to another network (e.g., network 190). Examples of the network 190 include, but are not limited to, a fiber-optic network (e.g., a local area network (LAN), metropolitan area network (MAN), wide area network (WAN), or a long-haul network), or a converged optical network having functionalities of both a wireless network and a wired network.

In some embodiments, for example, the router 101 (and the router 111) can enable communication between components (e.g., peripheral processing devices, portions of the switch fabric; not shown) associated with a switch fabric system. The communication can be defined based on, for example, a layer-3 routing protocol. In some embodiments, the router 101 (and the router 111) can have one or more network interface devices (e.g., 10 Gb Ethernet devices) through which the router 101 (and the router 111) can send electrical signals to and/or receive electrical signals from, for example, a switch fabric and/or other peripheral processing devices. The router 101 can also send electrical signals to and/or receive electrical signals from the optical transponder 102; the router 111 can send electrical signals to and/or receive electrical signals from the optical transponder 112.

The optical transponder 102 can be operatively coupled to the router 101, and operatively coupled to the optical transponder 112 via the set of optical links 131-133. The optical transponder 112 can be operatively coupled to the router 111. The optical transponder 102 and the optical transponder 112 can be structurally and/or functionally similar. The optical transponder 102 (and the optical transponder 112) can include any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, and/or the like. The optical transponder 102 can be configured to receive electrical signals from and/or send electrical signals to the router 101. The optical transponder 102 can receive optical signals from and/or send optical signals to the optical transponder 112 via one or more optical links from the set of optical links 131-133. Similarly, the optical transponder 112 can be configured to receive electrical signals from and/or send electrical signals to the router 111. The optical transponder 112 can receive optical signals from and/or send optical signals to the optical transponder 102 via one or more optical links from the set of optical links 131-133. Details of optical transponder 102 (or optical transponder 112) are discussed herein with regards to FIG. 2.

In some instances, the optical transponder 102 is disaggregated from router 101, i.e., the optical transponder 102 is located separately from router 101. Similarly stated, the optical transponder 102 and the router 101 are not co-located within the same physical device or the equivalent of the same physical device. In some instances, the router 101 can communicate with router 111 without the operational knowledge of the optical transponder 102, the optical transponder 112, and/or the optical links 131-133. For example, when the router 101 transmits a data packet and the router 111 is the destination router (or one of the nodes along the transmission path), the router 101 has the address (e.g., Media Access Control (MAC) address, Internet Protocol (IP) address, and/or the like) of the router 111. The router 101 does not have the address of the optical transponder 102, the optical transponder 112, or the set of optical links 131-133. Similarly, in some instances, the optical transponder 112 is disaggregated from router 111, i.e., the optical transponder 112 is located separately from router 111. Similarly stated, the optical transponder 112 and the router 111 are not co-located within the same physical device or the equivalent of the same physical device. In some instances, the router 111 can communicate with router 101 without the operational knowledge of the optical transponder 112, the optical transponder 102, and/or the optical links 131-133. For example, when the router 111 transmits a data packet and the router 101 is the destination router (or one of the nodes along the transmission path), the router 111 has the address (e.g., Media Access Control (MAC) address, Internet Protocol (IP) address, and/or the like) of the router 101. The router 111 does not have the address of the optical transponder 112, the optical transponder 102, or the set of optical links 131-133.

The set of optical links 131-133 can include a medium capable of carrying optical signals. For example, the set of optical links 131-133 can include a common optical fiber (or multiple optical fibers) that interconnects the optical transponder 102 and the optical transponder 112. In some instances, each optical link from the set of optical links 131-133 can be included in an individual optical fiber. Each optical link from the set of optical links 131-133 can be uniquely associated with a wavelength of an optical signal. Multiple optical links carrying optical signals with multiple wavelengths can be transported via common optical fiber. The optical links 131-133 can be included within an optical network that includes other optical links and optical devices (not shown). The number of the optical links 131-133 shown in the figure is for illustration purpose only and can include more or less than three optical links.

The number and arrangement of devices shown in FIG. 1 are provided as an example. In some embodiments, there may be additional devices, fewer devices, different devices, or differently arranged devices than those shown in FIG. 1. For example, the optical communication system 100 can include one or more optical devices (not shown in the figure) operatively coupled to the optical transponders 102 and 112. The one or more optical devices (not shown in the figure) can include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a wavelength selective switch, a free space optics device, a combination of the above, and/or another type of device capable of processing and/or transferring optical traffic. The one or more optical devices (not shown in the figure) can process an optical signal and/or transmit an optical signal to another optical device (and/or to optical transponders 102 and 112) via optical links 131-133 or a portion of optical links 131-133.

Figure 2:
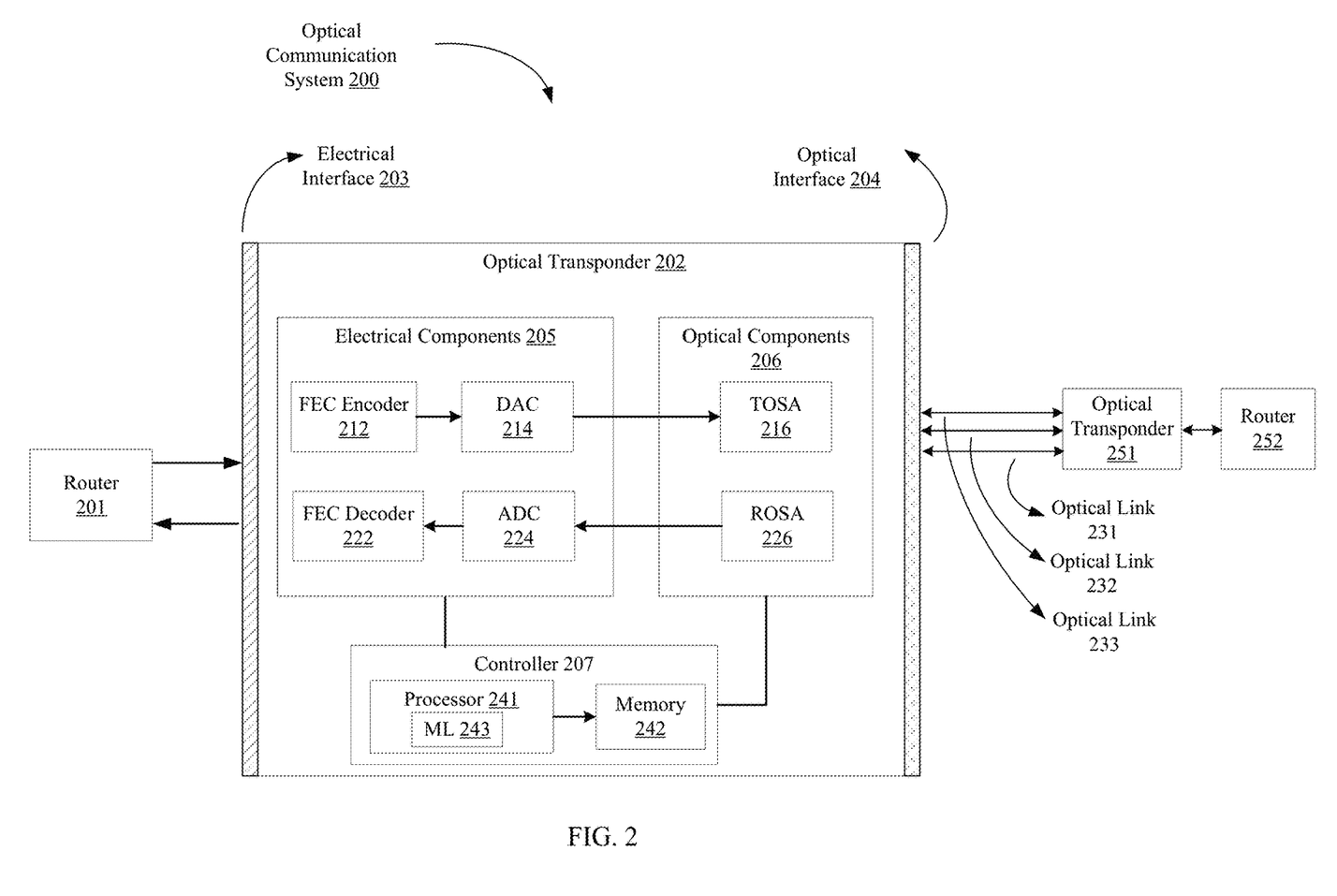
FIG. 2 is a block diagram illustrating an optical communication system, according to an embodiment.

FIG. 2 is a block diagram illustrating an optical communication system, according to an embodiment. The optical communication system 200 can be structurally and/or functionally similar to the optical communication system 100 in FIG. 1. The optical communication system 200 includes routers 201 and 252, optical transponders 202 and 251, and a set of optical links 231-233. The router 201 can be operatively coupled to the optical transponder 202. The optical transponder 202 can be commutatively and/or operatively coupled to the optical transponder 251 via the set of optical links 231-233. The optical transponder 251 can be operatively coupled to the router 252. The optical transponder 202 can be operatively coupled between the set of optical links 231-233 and the router 201. The optical transponder 251 can be operatively coupled between the set of optical links 231-233 and the router 252. The optical transponders 202 and 251 can be structurally and/or functionally similar to the optical transponders 102 and 112 in FIG. 1. The routers 201 and 252 can be structurally and/or functionally similar to the routers 101 and 111 in FIG. 1. The set of optical links 231-233 can be structurally and/or functionally similar to the set of optical links 131-133 in FIG. 1. The optical transponder 202 can be commutatively coupled, via the set of optical links 231-233 to a network (not shown in FIG. 2) similar to the network 190 in FIG. 1.

The router 201 can be configured to send diagnosis packets to the router 252 to notify the router 252 of a degradation and/or a failure of one or more components over the transmission path between the router 201 and the router 252. Similarly, the router 252 can be configured to send diagnosis packets to the router 201 to detect and/or notify the router 201 of a degradation and/or a failure of one or more components over the transmission path between the router 252 and the router 201. For example, the router 201 can detect a degradation and/or a failure at the optical transponders 202 or 251, the links between the router 201 and the optical transponder 202, and/or one or more optical links 231-233.

The diagnosis packets can be, for example, bidirectional forwarding detection (BFD) packets, Ethernet Operations, Administration, and Maintenance (E-OAM) packets (e.g., Ethernet connectivity fault management packets, or link fault management packets), and/or the like. The diagnosis packets can be sent between a local node (e.g., router 201) and a remote node (e.g., router 252) at a time interval (e.g., predetermined time intervals, random time intervals, etc.), by a manual request (e.g., by a network administrator), by an automatic request (e.g., without human intervention), and/or in response to meeting a criteria (e.g., the pre-FEC BER value substantially reaching a pre-determined threshold). The nodes (i.e., the router 201 and the router 252) can be configured to support various protocols including, for example, BGP (Border Gateway Protocol), EIGRP (Enhanced Interior Gateway Routing Protocol), IS-IS (Intermediate System-to-Intermediate System), OSPF (Open Shortest Path First), or HSRP (Hot Standby Router Protocol). These protocols detect forwarding path detection failures and allow failure messages to be transmitted. In some implementations, the diagnosis information can be transmitted in a form of overhead bytes in the frame, not in the form of diagnosis packets.

The router can be configured to include capabilities to execute functions based on fast reroute protocols, which allow rapid recovery in the event or anticipation of a failure of a network link or a network node. In a network employing Fast Reroute ("FRR") (e.g., a network implementing Multiprotocol Label Switching (MPLS) Traffic Engineering), traffic flowing through a degraded transmission path (e.g., a degraded or failed link or node, or a link or node predicted to fail) is rerouted through one or more preconfigured backup paths (or a different transmission path). For example, in the event of a degradation or a failure of the optical link 232, the routers 201 and 252 can initiate Fast Reroute and direct traffic to another optical link (e.g., optical link 231) or through optical transponders other than optical transponders 202 and 251.

The optical transponder 202 (or the optical transponder 251) can include any high data rate (e.g., 100 Gbps) optical transceiver such as a transceiver implementing intensity modulation with direct detection, e.g., a coherent optical transceiver, a coherent optical M-ary quadrature amplitude modulation (M-QAM) transceiver, a coherent polarization-multiplexed (PM) M-QAM transceiver, and/or the like. The optical transponder 202 can be configured to receive electrical signals from and/or send electrical signals to the router 201. The optical transponder 202 can receive optical signals from and/or send optical signals to the optical transponder 251 via one or more optical links from the set of optical links 231-233.

The optical transponder 202 (or the optical transponder 251) can include an electrical interface 203, an optical interface 204, electrical components 205, optical components 206, and a controller 207. The electrical components 205 can include a forward error correction (FEC) encoder 212, a forward error correction (FEC) decoder 222, a digital-to-analog converter (DAC) 214, and an analog-to-digital converter (ADC) 224. The optical components can include a transmit optical sub-assembly (TOSA) 216 and a receiver optical sub-assembly (ROSA) 226. The controller 207 can include a processor 241 and a memory 242. Each component of the optical transponder 202 can be operatively coupled to another component of the optical transponder 202.

The number and arrangement of components shown in FIG. 2 are provided as an example. In some embodiments, there may be additional components, fewer components, different components, or differently arranged components than those shown in FIG. 2. For example, the optical transponder 202 can include a digital signal processor (DSP) (not shown in the figure), which can receive the electrical signals from the FEC encoder and perform appropriate signal processing such as spectral shaping, equalization for optical and electrical impairments, and other such signal processing to ensure that the highest-fidelity transmit waveforms with desired characteristics are transmitted into the optical communication system 200. For another example, each component of the optical transponder 202 can access a memory component (e.g., memory 242) and share the use of the memory component.

When the optical transponder 202 transmits traffic from west to east, the FEC encoder 212, the DAC 214, and the TOSA 216 together transmit traffic to the optical transponder 251 via at least one of the optical links 231-233. When the optical transponder 202 receives traffic from east to west, the ROSA 226, the ADC 224, and the FEC decoder 222 receive traffic from the optical transponder 252 via at least one of the optical links 231-233.

The FEC encoder 212 can be or can include a general purpose processor, a field-programmable gate array (FPGA), an application specific integrated circuit (ASIC), a combination thereof, or other equivalent integrated or discrete logic circuity. The FEC encoder 212 can also include a memory (e.g., a random-access memory (RAM) (e.g., a dynamic RAM, a static RAM), a flash memory, a removable memory, and/or so forth.) Forward Error Correction (FEC) is a technique for transmitting data such that transmission errors may be minimized. FEC coding redundantly codes each bit to allow a receiving decoder to detect and correct transmission errors. Specifically, for example, the FEC encoder 212 can receive a set of electrical signals (having data signals and/or data packets) from the electrical interface 203 (or from a network processor located upstream (e.g., router 201)), and encodes the set of electrical signals based on a pre-determined algorithm. The FEC encoder 212 can generate FEC overhead bits and add the FEC overhead bits to the electrical signal. The FEC overhead bits are encoded such that the optical transponder 251 (or the FEC decoder (not shown) in the optical transponder 251) can use the information within the FEC overhead bits to detect and correct bit errors in the payload of the electrical signal received by the optical transponder 251 after converting the related optical signal. Bit errors may be incurred in the transmission path (e.g., the optical components 206 of the optical transponders 202 or 251, and/or the optical links 231-233) between the optical transponder 202 and optical transponder 251.

The DAC 214 can receive the digital electrical signals from the FEC encoder 212 and convert those signals to analog electrical signals. The analog electrical signals can then be sent to the optical components 206. The DAC 214 can be or can include a general purpose processor, a field-programmable gate array (FPGA), an application specific integrated circuit (ASIC), a combination thereof, or other equivalent integrated or discrete logic circuitry. The DAC 214 can also include a memory (e.g., a random-access memory (RAM) (e.g., a dynamic RAM, a static RAM), a flash memory, a removable memory, and/or so forth.)

The transmit optical sub-assembly (TOSA) 216 includes optical components that receive electrical signals from the DAC 214 and convert these electrical signals into modulated optical signals. For example, the TOSA 216 can modulate an optical source signal with the electrical signals to generate a set of optical signals carrying the information contained in the electrical signals. The TOSA 216 can also include optical sources (e.g., a tunable laser), drivers, modulators, splitters, combiners, attenuators, amplifiers, polarization rotators, power meters, and the like. The TOSA 216 transmits the optical signal to the optical interface 204 which then transmits the optical signals to the network (not shown in the figure; similar to the network 190 as in FIG. 1) via a single optical fiber (or multiple optical fibers). The single optical fiber (or multiple optical fibers) can include one or more optical links 231-233.

The FEC decoder 222 can be configured to correct bit errors in data transmission from the remote router 252 or the optical transponder 251 over the transmission path (e.g., the optical components 206 of the optical transponders 202 or 251, and/or the optical links 231-233) to improve data reliability. The FEC decoder 222 can be or can include a general purpose processor, a field-programmable gate array (FPGA), an application specific integrated circuit (ASIC), a combination thereof, or other equivalent integrated or discrete logic circuitry. The FEC decoder 222 can also include a memory (e.g., a random-access memory (RAM) (e.g., a dynamic RAM, a static RAM), a flash memory, a removable memory, and/or so forth.) The FEC decoder 222 can receive a set of electrical signals, each having a payload together with FEC overhead bits from the ADC 224, and detect and correct bit errors that have occurred over the transmission path, and recover the data information included in the set of electrical signals. In one implementation, the FEC encoder 212 and the FEC decoder 222 can implement quasi-cyclic low-density parity-check (QC-LDPC) codes.

The FEC decoder 222 can be configured to measure the bit error rate (BER), which represents the number of bit errors per unit time. In some instances, in addition to measuring the bit error rate, the FEC decoder 222 can be configured to measure the bit error ratio, which represents the number of bit errors divided by the total number of transferred bits during a time interval. The bit error rate or the bit error ratio can show a degree of errors that has occurred over the transmission path (e.g., the optical components 206 of the optical transponders 202 or 251, and/or the optical links 231-233). The FEC decoder 222 can be configured to measure the BER value before or after the FEC decoder 222 corrects the bit errors. The BER value measured before the FEC decoder 222 corrects the bit errors is referred to as pre-FEC BER value. The pre-FEC BER value can be used as an indication of potential and actual signal degradation over the transmission path. The signal degradation can occur at one or more optical links (e.g., optical link 232) or anywhere over the transmission path between an optical transmitter or an optical receiver. For example, if data packets are transmitted from the optical transponder 202 to the optical transponder 251, the pre-FEC BER value measured by the FEC decoder (not shown in the figure) at the optical transponder 251 can be an indicator of potential or actual signal degradation at one (or more) optical links 231-233 or anywhere between the FEC encoder 212 of the optical transponder 202 and the FEC decoder (not shown in the figure) of the optical transponder 251.

The ADC 224 can receive the analog electrical signals from the optical components 206 and convert those signals to digital electrical signals. The digital electrical signals can then be sent to the FEC decoder 222. The ADC 224 can be or can include a general purpose processor, a field-programmable gate array (FPGA), an application specific integrated circuit (ASIC), a combination thereof, or other equivalent integrated or discrete logic circuitry. The ADC 224 can also include a memory (e.g., a random-access memory (RAM) (e.g., a dynamic RAM, a static RAM), a flash memory, a removable memory, and/or so forth.)

The receiver optical sub-assembly (ROSA) 226 can receive optical signals from the network (not shown in the figure; similar to the network 190 as in FIG. 1) via one or more optical links 231-233 in a single optical fiber (or multiple optical fibers), and convert the optical signals into electrical signals. The ROSA 226 can transmit the electrical signals to the ADC 224. The ROSA 226 can include optical hybrids, photodetectors, transimpedance amplifiers and attenuators, and alike.

The controller 207 can include components and/or circuitry configured to control properties of an optical signal, an electrical signal, and/or send control signals to one or more components of optical transponder 202. For example, controller 207 can send control signals to and thus control properties of one or more components within the electrical components 205 and/or one or more components within the optical components 206.

In some implementations, the controller 207 is a hardware device and/or software (executed on a processor and/or stored in memory) external to the optical components 206 and within the optical transponder 202. In other implementations, controller 207 is a hardware device and/or software (executed on a processor and/or stored in memory) implemented within the optical components 206 or the electrical components 205 of the optical transponder 202. In yet other implementations, the controller 207 is disposed external to the optical transponder 202 and operatively coupled to a plurality of optical transponders (including the optical transponder 202). In such implementations, the controller 207 can send control signals to multiple optical transponders.

The controller 207 can include a processor 241 and a memory 242 operatively coupled to the processor 241. The processor 241 can be or include any processing device or component configured to perform the data collecting, processing and transmitting functions as described herein. The processor 241 can be configured to, for example, write data into and read data from the memory 242, and execute the instructions stored within the memory 242. Processor 241 can also be configured to execute and/or control, for example, the operations of the memory 242. The processor 241 includes a machine learning system 243 that is configured to determine and adaptively adjust a set of parameters associated with the optical transponder via machine learning algorithms. In some implementations, based on the methods or processes stored within the memory 242, the processor 241 can be configured to execute the adaptive degradation detection process, as described in FIG. 5.

The memory 242 can be, for example, a random-access memory (RAM) (e.g., a dynamic RAM, a static RAM), a flash memory, a removable memory, and/or so forth. In some embodiments, the memory 242 can include, for example, a database, process, application, virtual machine, and/or some other software modules (stored and/or executing in hardware) or hardware modules configured to execute an adaptive degradation detection process as described further herein. In such implementations, instructions of executing the adaptive degradation detection process and/or the associated methods can be stored within the memory 242 and executed at the processor 241.

The electrical interface 203 allows the exchange of electrical signals between the router 201 and the optical transponder 202. The electrical interface 203 can include and/or be configured to manage one or multiple electrical ports of the optical transponder 202. In some instances, for example, the electrical interface 203 can include one or more line cards, each of which can include one or more ports (operatively) coupled to devices (e.g., router 201). A port included in the electrical interface 203 can be any component or device that can communicate with a coupled device or over a network. In some embodiments, such a port need not necessarily be a hardware port, but can be a virtual port or a port defined by software. In some embodiments, the connections between the electrical interface 203 and the devices in the optical communication system 200 can be implemented via a physical layer using, for example, electrical cables, wireless connections, or other suitable connection means. In some embodiments, the electrical interface 203 can be an Ethernet interface.

The optical interface 204 allows the exchange of optical signals between the optical transponder 202 and the network (not shown in the figure; similar to network 190 in FIG. 1) or optical devices in the optical communication system 200. The optical interface 204 can include and/or be configured to manage one or multiple optical ports of the optical transponder 202.

Each optical link from the set of optical links 231-233 can include a medium capable of carrying optical signals. For example, optical link 231 can include an optical fiber that interconnects optical transponders 202 and 251 via optical ports (not shown) of the optical interface 204 and optical ports of the optical interface (now shown) of the optical transponder 251. The optical link 231 can be included within an optical communication system 200 that includes other optical links and optical devices. The set of optical links 231-233 can carry optical signals with different wavelengths (e.g., colored interface).

Figure 3:
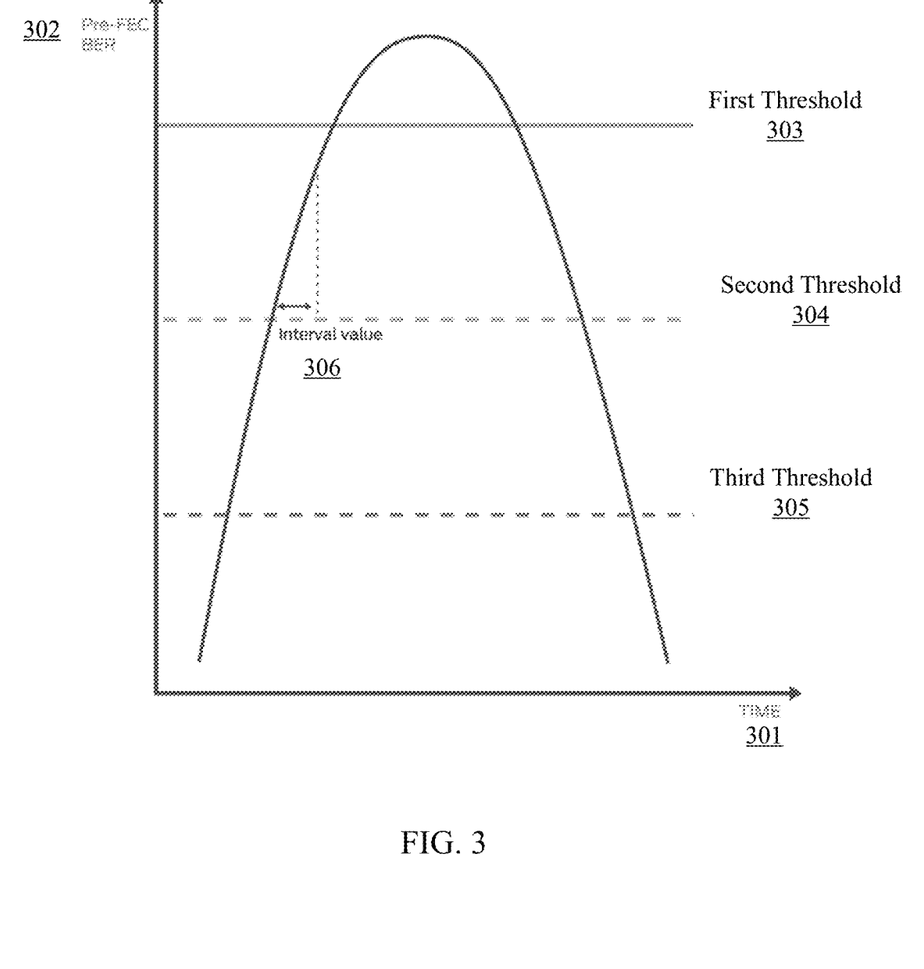
FIG. 3 is a graph illustrating a pre-forward error correction (FEC) bit error rate (BER) value of an optical transponder as a function of time, according to an embodiment.

FIG. 3 is a graph illustrating an example of a pre-FEC BER value 302 of an optical transponder as a function of time 301, according to an embodiment. In some implementations, upon receiving a set of optical signals via a set of optical links (e.g., the set of optical links 231-233 in FIG. 2), an optical transponder (e.g., optical transponder 251 in FIG. 2) can convert the set of optical signals to a set of electrical signals and measure the pre-FEC BER value of the set of electrical signals. The FEC decoder of the optical transponder can measure the pre-FEC BER value before the FEC decoder corrects the bit errors that have occurred during the transmission of the set of optical signals over a transmission path. The pre-FEC BER value 302 can be used as an indication of potential or actual signal degradation over the transmission path. The signal degradation can occur at one or more optical links (e.g., optical link 232 in FIG. 2) or anywhere over the transmission path between an optical transmitter and an optical receiver. The transmission path between the optical transmitter (e.g., optical transponder 202) and the optical receiver (e.g., optical transponder 251) can include the optical transmitter (e.g., optical transponder 202), the optical receiver (e.g., optical transponder 251), the set of optical links (e.g., 231-233), other optical connectors, and/or optical devices between the optical transmitter and the optical receiver.

In some implementations, user-configurable thresholds (e.g., 303, 304, 305) can be determined to trigger notifications of signal degradation and/or failures. The controller of the optical transponder (e.g., the controller 207 in FIG. 2) monitors the pre-FEC BER of the received data at each port and provides an early warning of signal degradation based on a set of parameters including, but not limited, the first threshold 303, the second threshold 304, the third threshold 305, and the interval value 306. The set of parameters can be experimentally determined via machine learning algorithms. In some implementations, the initial values of the set of parameters can optionally be determined automatically based on historical data, or manually by a system administrator. The machine learning algorithms can be used to modify and adaptively adjust these parameters based on the local noise condition of the optical communication system.

The first threshold 303 (or the FEC limit) indicates a threshold value of the pre-FEC BER that the FEC decoder of an optical transponder can correct the bit errors in the received signal. When the pre-FEC BER is below the first threshold 303, the bit errors can be successfully identified and corrected, and thus no packet loss occurs (or minimal packet loss occurs at an acceptable level). In response to the pre-FEC BER exceeding the first threshold 303, in some instances, the FEC decoder of the optical transponder cannot correct the bit errors and the received packets cannot be sufficiently processed (e.g., packet loss occurs at an unacceptable level). In response to the pre-FEC BER exceeding the second threshold 304 and below the first threshold 303, the controller (e.g., the controller 207 in FIG. 2) can send an alarm signal (e.g., to routers 201 and/or 252) indicating a signal degradation. The optical transponder (or the routers 201 and 252) can take preemptive actions (or trigger traffic protection protocol(s); e.g., stop forwarding packets via the interface, reroute to another interface or another transmission path, another link protection method, and/or the like) to minimize or prevent packet loss before the first threshold 303 (the FEC limit) is reached. In some implementations, the parameter referred to herein as the interval value 306 can be determined such that only when the pre-FEC BER exceeds the second threshold 304 and is below the first threshold 303 for a period of the interval value 306, the alarm signal indicating the signal degradation is generated and sent. After the alarm signal is sent, in response to the pre-FEC BER value being below the third threshold 305, the alarm signal can be cleared and no preemptive actions (or traffic protection protocol(s)) need to be taken (e.g., the degraded interface or transmission path returns to the normal operation). The alarm signal can be cleared, for example, by sending another signal or message indicating that the pre-FEC BER value fell below the third threshold 305.

Figure 4A:
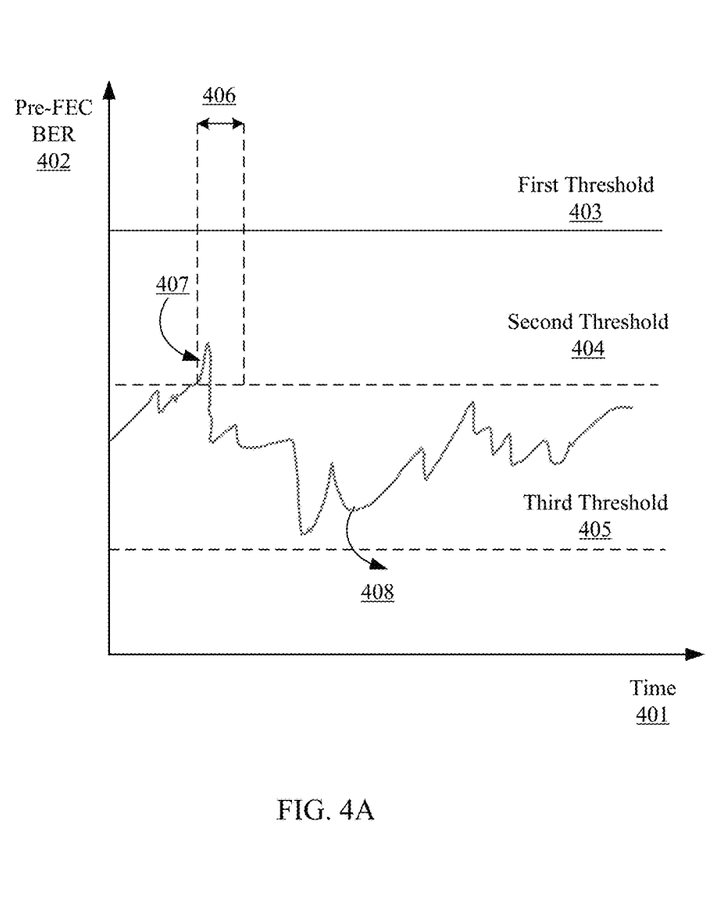
FIG. 4A is a graph illustrating an example of a pre-FEC BER value of an optical transponder as a function of time in a high noise optical network, according to an embodiment.

FIG. 4A is a graph illustrating an example of a pre-FEC BER value 402 of an optical transponder as a function of time 401 in a high noise optical network, according to an embodiment. Upon receiving a set of optical signals via a set of optical links (e.g., the set of optical links 231-233 in FIG. 2), an optical transponder (e.g., optical transponder 251 in FIG. 2) can convert the set of optical signals to a set of electrical signals and measure the pre-FEC BER value of the set of electrical signals. The FEC decoder of the optical transponder can measure a plurality of pre-FEC BER values at a plurality of times before the FEC decoder corrects the bit errors that have occurred during the transmission of the set of optical signals over the transmission path. The FEC decoder can send the plurality of pre-FEC BER values measured at the plurality of times to a processor (e.g., the processor 241 in FIG. 2) Based on the plurality of pre-FEC BER value at the plurality of times, the processor can determine a signal pattern of the optical communication system. The signal pattern can be a high noise signal pattern, a bursty noise signal pattern, and/or the like. In a high noise signal pattern, the noise occurs frequently while the amplitude of the noise is relatively smaller compared to the amplitude of the signal. In a busty noise signal pattern, the amplitude of the noise can increase to a high level very quickly (i.e., a peaky noise). The processor can, in some implementations, adaptively adjust a set of parameters of the optical transponder based on the signal pattern such that a signal degradation of the transmission path can be correctly identified and traffic loss can be reduced or minimized.

When the optical communication system has a high noise signal pattern, the pre-FEC BER value 407 may exceed or substantially exceed the second threshold 404 for a short period of time and return to a range 408 between the second threshold 404 and the third threshold 405. In some instances, the pre-FEC BER value 407 substantially exceeds the second threshold 404 when the pre-FEC BER value 407 is within a certain range of the second threshold (e.g., within 5% difference of the second threshold).

In response to the pre-FEC BER value 407 exceeding (or substantially exceeding) the second threshold 404, in some instances, the controller (e.g., the controller 207 in FIG. 2) can generate an alarm signal indicating a signal degradation of a transmission path. In some instances, the pre-FEC BER value 404 substantially exceeds the second threshold 404 when the pre-FEC BER value 404 is within a certain range of the second threshold (e.g., within 5% difference of the second threshold). The optical transponder can take preemptive actions (or trigger traffic protection protocol(s); e.g., stop forwarding packets via the degrading interface (or the transmission path), reroute to another interface (or another transmission path), another link protection method, and/or the like) to minimize or prevent packet loss. In such instances, however, the pre-FEC BER value 407 exceeds the second threshold 404 only for a short period of time largely due to the noise in the optical network. Even though the pre-FEC BER value quickly returns to an acceptable range 408 between the second threshold 404 and the third threshold 405 and remains in the range 408, the alarm signal was raised to suspend the interface (or the transmission path) for a period of time but does not exit the alarm state because the pre-FEC BER value 407 does not drop below the third threshold 405. Such a situation is an example of what is referred to as a "false positive". It results in the interface (or transmission path) being idle for the period of time and a less efficient optical communication system.

In some implementations, the controller (e.g., controller 207 in FIG. 2) can adaptively adjust the second threshold 404 and the third threshold 405 (e.g., via machine learning algorithms) to avoid the false alarm. For example, the controller can increase the third threshold 405 (e.g., from a first value to a second value greater than the first value) to be closer to the second threshold 404 such that the pre-FEC BER value falls below the third threshold 405 quickly after the noisy peak of pre-FEC BER value 407. In response to the pre-FEC BER value 402 being below or substantially below the third threshold 405, the controller can remove the alarm signal and the degrading interface (or the transmission path) returns to the normal operation from the idle suspension. In some instances, the pre-FEC BER value 402 is substantially below the third threshold 405 when the pre-FEC BER value 402 is within a certain range of the third threshold (e.g., within 5% difference of the third threshold).

In other instances, in response to the pre-FEC BER value 402 being below the third threshold 405, the controller can send a second signal to stop the traffic rerouting (or trigger other link protection methods or traffic protection protocols). For another example, the controller can increase the second threshold 404 (e.g., from a first value to a second value greater than the first value) to be closer to the first threshold 403 and below the first threshold 403 such that the noisy peak of pre-FEC BER value 407 does not exceed the second threshold 404 and the controller does not generate the alarm signal. The interface continues to operate normally without an interruption of traffic flow.

Figure 4B:
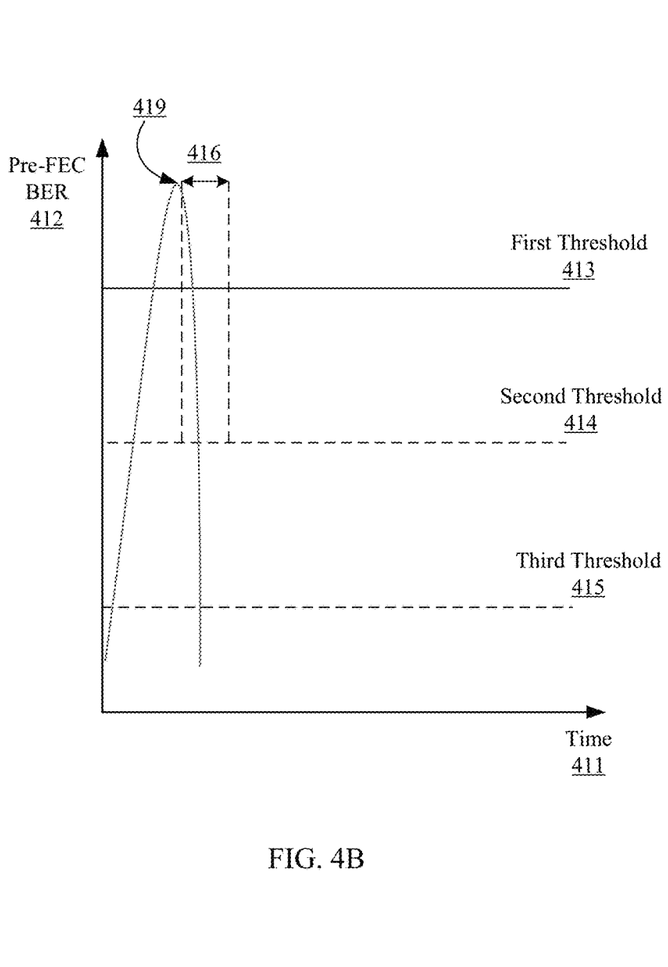
FIG. 4B is a graph illustrating an example of a pre-FEC BER value of an optical transponder as a function of time in a bursty noise optical network, according to an embodiment.

FIG. 4B is a graph illustrating an example of a pre-FEC BER value 412 of an optical transponder as a function of time 411 in a bursty noise optical network, according to an embodiment. The FEC decoder of the optical transponder can measure a plurality of pre-FEC BER values at a plurality of times before the FEC decoder corrects the bit errors that have occurred during the transmission of the set of optical signals over the transmission path. The FEC decoder can send the plurality of pre-FEC BER values measured at the plurality of times to a processor (e.g., the processor 241 in FIG. 2) Based on the plurality of pre-FEC BER value at the plurality of times, the processor can determine a signal pattern of the optical communication system.

When the optical communication system includes a bursty noise signal pattern, in some implementations, the controller can decrease the second threshold 414 (e.g., from a first value to a second value less than the first value) such that the noisy peak of pre-FEC BER value 419 reaches or substantially reaches the second threshold 414 earlier to raise the alarm signal. In some instances, the pre-FEC BER value 419 substantially reaches the second threshold 414 when the pre-FEC BER value 419 is within a certain range of the second threshold (e.g., within 5% difference of the second threshold). This allows the optical transponder (or the local router, remote router) more time to respond to the signal degradation of the first transmission path and implement preemptive actions (or trigger traffic protection protocols; e.g., reroute traffic to a second transmission path different from the first transmission path). For another example, the controller can decrease the third threshold 415 (e.g., from a first value to a second value less than the first value) to allow the interface (or the first transmission path) to stay idle for a longer period of time such that preemptive actions locally and remotely can be implemented. In response to the pre-FEC BER value 412 being below or substantially below the third threshold 415, the controller can remove the alarm signal and the degrading interface (or the transmission path) returns to the normal operation from the idle suspension. In other instances, in response to the pre-FEC BER value 412 being below the third threshold 415, the controller can send a second signal to stop the traffic rerouting (or trigger other link protection methods). In yet other implementations, the controller can be configured to not take any actions (not send the alarm signal) because the noisy peak of pre-FEC BER value 419 ends quickly and the optical transponder returns to the normal operation despite the short disruption.

In some implementations, the controller can determine and adaptively adjust the set of parameters based on a machine learning system (such as the ML system 243 in FIG. 2) that analyzes the local noise condition (or the signal pattern) in the optical communication system. The set of parameters includes the second threshold (304 in FIGS. 3 and 404 and 414 in FIGS. 4A-4B) and the third threshold (305 in FIGS. 3 and 405 and 415 in FIGS. 4A-4B). In response to the pre-FEC BER value exceeding the second threshold, the controller can generate an alarm signal indicating a signal degradation of a transmission path. The controller can send the alarm signal to the local router and/or the remote router such that preemptive actions (e.g., stop forwarding packets via the degrading interface (or the transmission path), reroute traffic from a first transmission path to a second transmission path, another link protection method, and/or the like) are implemented to minimize or prevent traffic loss. In response to the pre-FEC BER value being below the third threshold, the controller can remove the alarm signal and the degraded interface returns to the normal operation. In these implementations, adaptively adjusting the set of parameters based on the machine learning of the local noise condition enables reliable error detection, early action after the detection of the signal degradation, and stable link states avoiding frequent false positives pushing traffic around (e.g., avoiding frequent toggling between the "up" state and the "down" state of a link, and avoiding frequent reroutes of the traffic.)

In some instances, the machine learning algorithm(s) can be an unsupervised times series analysis with a capability to allow reset of the machine learning algorithm(s). Such a reset can be appropriate, for example, when a new or replacement optical communications component/device is introduced into the optical communications system. Such a reset can be triggered, for example, by a user or automatically (without human intervention) upon detection of a new or replacement optical component/device being introduced into the optical communications system. In other instances, the machine learning algorithm(s) can be supervised. Example machine learning algorithms include, but are not limited to, linear regression, logistic regression, linear discriminant analysis, K Nearest neighbors, time series analysis, Fuzzy logic, artificial intelligence, and/or the like.

In some implementations, the set of parameters includes a soak time value 406 and 416 (also referred herein to as the interval value). The controller can determine and adaptively adjust the soak time value based on the machine learning system (such as the ML system 243 in FIG. 2) such that the controller can generate the alarm signal in response to the pre-FEC BER value exceeding (or substantially exceeding) the second threshold and being below (or substantially below) the first threshold 403 for a period of the soak time. In some instances, the pre-FEC BER value substantially exceeds the second threshold when the pre-FEC BER value is within a certain range of the second threshold (e.g., within 5% difference of the second threshold). In some instances, the pre-FEC BER value is substantially below the first threshold when the pre-FEC BER value is within a certain range of the first threshold (e.g., within 5% difference of the first threshold). Based on the local noise condition, the controller can set a longer soak time value to delay generating the alarm signal, or a shorter soak time value to implement more and quicker preemptive actions. For example, when the optical communication system includes a high noise signal pattern similar to FIG. 4A, the controller can set a soak time value longer than the duration of the noisy peak of pre-FEC BER value 407. Therefore, the pre-FEC BER does not exceed the second threshold for a period of the soak time and the controller does not generate the alarm signal. It results in a more effective optical communication system without frequent reroute actions or suspension of a normal interface when the optical communication system is in a high noise environment with relatively few peaks of pre-FEC BER value over the second threshold.

In some implementations, the set of parameters includes a hold-off timer. The controller can determine and adaptively adjust the hold-off timer value based on the machine learning system (such as the ML system 243 in FIG. 2) such that the controller keeps the alarm signal for a duration of the hold-off timer. In some instances, even when the pre-FEC BER value is below (or substantially below) the third threshold, the controller can keep the alarm signal and thus the interface (or the transmission path) is considered down for the duration of the hold-off timer value. This prevents the interface from toggling between the "up" state and the "down" state and gives more time to repair the interface (or the transmission path).

In some implementations, when determining and adaptively adjusting the set of parameters (including the second threshold, the third threshold, the soak time, the hold-off timer) based on the machine learning system, the controller can take into account different sources of signal degradation and weighted the sources differently to prevent frequent toggling between the "up" state and the "down" state of an interface. For example, when the noise is generated by an amplifier (and the processor determines the identity of the source device of the degradation is the amplifier), it often has a noise pattern (or a signal pattern) similar to a white noise. Thus, the noise amplitude is low with slow or no change to the amplitude. For another example, when the noise is caused by a degrading connector (and the processor determines the identity of the source device of the degradation is the connector), the power of the optical signal can change relatively quickly. By detecting the change in the power, the controller can determine the noise pattern (or signal pattern) of the degrading connector. When the noise is a quick noise (i.e., short duration), the controller can decrease the hold-off timer value such that the interface (or the transmission path) can return to the normal operation quickly.

In some implementations, the controller can be disposed external to the optical transponder and operatively coupled to a plurality of optical transponders. The controller can determine and adaptively adjust the set of parameters of the plurality of optical transponders based on the machine learning system (such as the ML system 243 in FIG. 2), taking into account of the overall efficiency of the plurality of optical transponders. For example, in an event that multiple links of the plurality of optical transponders are degrading, the controller can increase the second thresholds of all the remaining links to avoid them going "down" as well such that traffic can continue to flow via the remaining links. For another example, in DWDM networks, some router-to-router connections between different pairs of router can be placed to a single piece of fiber. If that fiber (or the connectors or amplifiers there) is degraded, many router-to-router links can degrade at the same time. The controller can consider each router-to-router link and take actions (e.g. raising or lowering the second threshold and/or the third threshold) for all connections of that fiber connection.

In some implementations, the controller can monitor the pre-FEC BER values and perform statistical processing such as, for example, rolling average of the pre-FEC BER and standard deviation of pre-FEC BER. The controller can adjust the set of parameters by using a higher weight for recent data and a lower weight for older data. For example, if the average pre-FEC BER is stable and the standard deviation is low, the second threshold can be set closer to the first threshold to avoid unnecessary rerouting attempts. If the pre-FEC BER is volatile and the standard deviation is high, the potential for sudden interruption is high. Thus, the controller can decrease the second threshold, which can result in triggering rerouting too quickly but allowing the possibility to reroute in a short timeframe.

In other implementations, the controller can adaptively adjust the characteristic of the set of parameters based on the pre-FEC BER pattern (or the signal pattern) and the machine learning system. For example, if the pre-FEC BER is changing relatively slowly, the fast reroute can be triggered by a sudden change of pre-FEC BER rather than an absolute threshold. If the pre-FEC BER is relatively volatile, the fast reroute can be triggered based on the median value of the pre-FEC BER rather than a single telemetry value of the pre-FEC BER.

Figure 5:
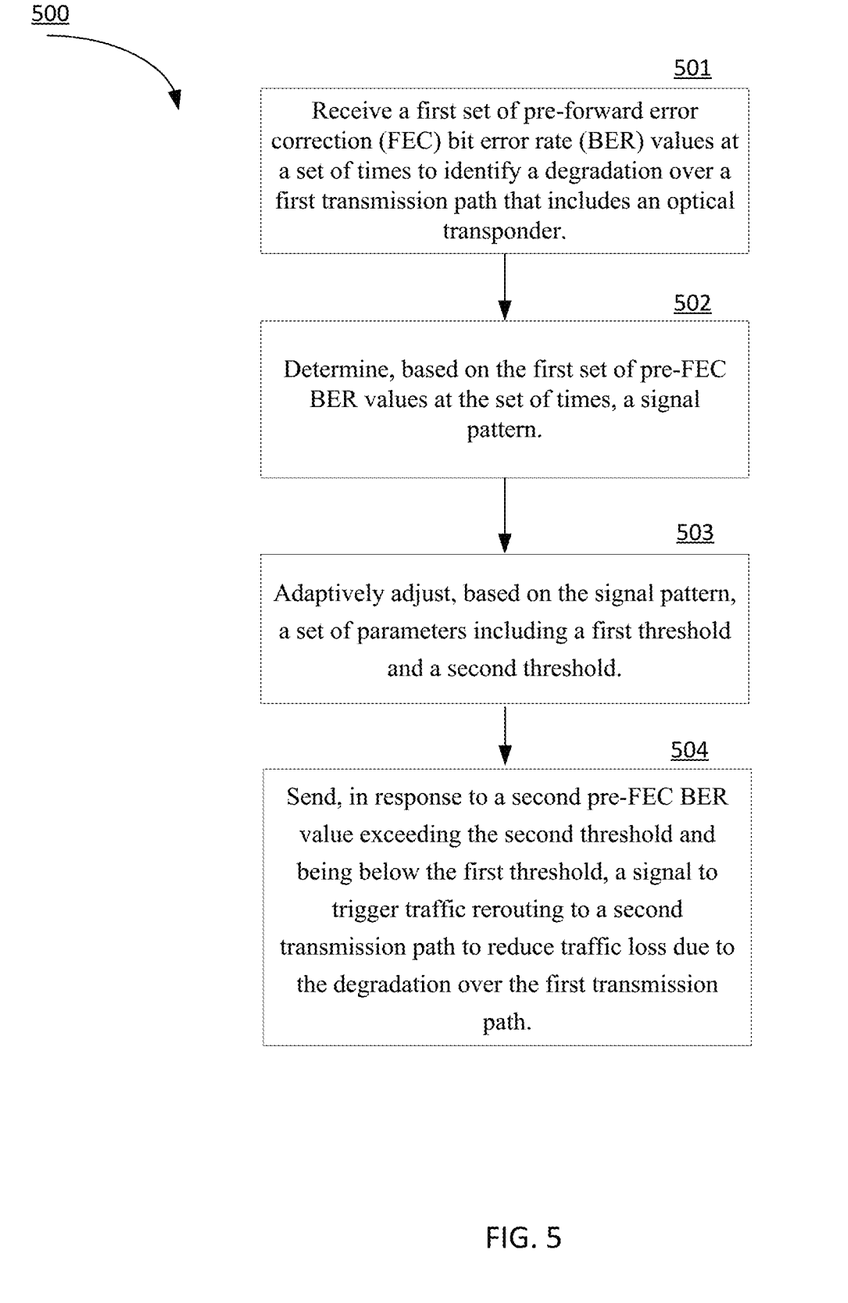
FIG. 5 is a flow chart illustrating a method to adaptively detect degradation of an optical transponder in an optical communication system, according to an embodiment.

FIG. 5 is a flow chart illustrating a method 500 to adaptively detect and adjust for degradation of an optical transponder in an optical communication system, according to an embodiment. The adaptive detection of the signal degradation process can be executed at, for example, a processor such as the processor 241 of the controller 207 shown and described with respect to FIG. 2.

At 501, a first set of pre-forward error correction (FEC) bit error rate (BER) values is received at a set of times to identify a degradation over a first transmission path that includes an optical transponder. The optical transponder (e.g., the optical transponder 251 in FIG. 2) receives a set of optical signals over a first transmission path in the optical communication system. The first transmission path includes the optical transponder that transmits the set of optical signals, at least one optical link from the set of optical links (e.g., the optical links 231-233 in FIG. 2). In some instances, the first transmission path can include a local router, a remote router, other optical connectors, and/or optical devices that transmit the set of optical signals. The forward error correction (FEC) decoder of the optical transponder measures the first set of pre-FEC BER values at the set of times before the FEC decoder corrects the bit errors. The FEC decoder of the optical transponder then sends the first set of pre-FEC BER values to the processor. A BER value is the number of bit errors per unit time and represents a degree of errors that has occurred over the first transmission path. The pre-FEC BER value can be used as an indication of potential and actual signal degradation over the first transmission path. The signal degradation can occur at one or more optical links (e.g., optical link 232 in FIG. 2) or anywhere over the transmission path between an optical transmitter or an optical receiver.

At 502, based on the first set of pre-FEC BER values at the set of times, a signal pattern is determined. The signal pattern can be a high noise signal pattern, a bursty noise signal pattern, and/or the like. The signal pattern can be a high noise signal pattern, a bursty noise signal pattern, and/or the like. In a high noise signal pattern, the noise occurs frequently while the amplitude of the noise is relatively smaller compared to the amplitude of the signal. In a busty noise signal pattern, the amplitude of the noise can increase to a high level very quickly (i.e., a peaky noise).

At 503, based on the signal pattern, a set of parameters including a first threshold and a second threshold are adaptively adjusted, such that a signal degradation of the transmission path can be correctly identified and traffic loss can be reduced or minimized. The set of parameters can be user-configured or experimentally determined via machine learning algorithms. In some implementations, the initial values of the set of parameters can optionally be determined automatically based on historical data, or manually by a system administrator. The machine learning algorithms can be used to modify and adaptively adjust these parameters based on the local noise condition of the optical communication system. The first threshold (or the FEC limit) indicates a threshold value of the pre-FEC BER that the FEC decoder of an optical transponder can correct the bit errors in the received signal. When the pre-FEC BER (i.e., a second pre-FEC BER value) is below the first threshold, the bit errors can be successfully identified and corrected, and thus no packet loss occurs (or minimal packet loss occurs at an acceptable level). When the pre-FEC BER (i.e., a second pre-FEC BER value) exceeds the first threshold, the FEC decoder of the optical transponder cannot correct the bit errors and the received packets cannot be sufficiently processed (e.g., packet loss occurs at an unacceptable level). In response to the pre-FEC BER exceeding the second threshold and below the first threshold, the controller (e.g., the controller 207 in FIG. 2) can send an alarm signal (e.g., to routers 201 and/or 252) indicating a signal degradation.

The set of parameters can include a third threshold. When the second pre-FEC BER value exceeds the third threshold, an alarm signal can be cleared and no preemptive actions need to be taken (e.g., the degraded interface or transmission path returns to the normal operation). The alarm signal can be cleared, for example, by sending another signal or message indicating that the pre-FEC BER value fell below the third threshold 305.

When the optical communication system has a high noise signal pattern, a pre-FEC BER value from the first set of the pre-FEC BER values may exceed the second threshold only for a short period of time. Even though the pre-FEC BER value quickly returns to an acceptable range between the second threshold and the third threshold and remains in the range, the alarm signal was raised to suspend the interface (or the transmission path) for a period of time but does not exit the alarm state because the pre-FEC BER value does not drop below the third threshold. Such a situation is an example of what is referred to as a "false positive". It results in the interface (or transmission path) being idle for the period of time and a less efficient optical communication system. Thus, in some instances, the adaptively adjusting the set of parameters includes increasing the second threshold to be closer to the first threshold and below the first threshold such that the noisy peak of pre-FEC BER value does not exceed the second threshold and the controller does not generate the alarm signal. The interface continues to operate normally without an interruption of traffic flow. The adaptively adjusting the set of parameters can include increasing the third threshold to be closer to the second threshold such that the pre-FEC BER value falls below the third threshold quickly after the noisy peak of pre-FEC BER value. In response to the pre-FEC BER value being below the third threshold, the controller can remove the alarm signal, and the degrading interface (or the transmission path) returns to the normal operation from the idle suspension.

When the optical communication system includes a bursty noise signal pattern, in some instances, the adaptively adjusting the set of parameters includes decreasing the second threshold such that the noisy peak of pre-FEC BER value reaches the second threshold earlier to raise the alarm signal. This allows the optical transponder (or the local router, remote router) more time to respond to the signal degradation of the first transmission path and implement preemptive actions (e.g., reroute traffic to a second transmission path different from the first transmission path). In some instances, the adaptively adjusting the set of parameters includes decreasing the third threshold to allow the interface (or the first transmission path) to stay idle for a longer period of time such that preemptive actions locally and remotely can be implemented. In response to the pre-FEC BER value being below the third threshold, the controller can remove the alarm signal, and the degrading interface (or the transmission path) returns to the normal operation from the idle suspension.

At 504, in response to the second pre-FEC BER value exceeding the second threshold and being below the first threshold, a signal is sent to trigger traffic rerouting to a second transmission path to reduce traffic loss due to the degradation over the first transmission path. The optical transponder (or the local router, or the remote router) can take preemptive actions (e.g., stop forwarding packets via the interface, reroute to another interface or another transmission path, another link protection method, and/or the like) to minimize or prevent packet loss before the first threshold (the FEC limit) is reached. In the event of a degradation or a failure of the optical link, the router(s) can initiate Fast Reroute and direct traffic to another optical link or through optical transponders other than optical transponder.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

The invention claimed is:

1. A method, comprising:
receiving a plurality of pre-forward error correction (FEC) bit error rate (BER) values at a plurality of times to identify a degradation over a first transmission path that includes an optical transponder;
determining, based on the plurality of pre-FEC BER values at the plurality of times, a signal pattern;
adjusting, based on the signal pattern, a set of parameters including a first threshold and a second threshold; and
sending, in response to a pre-FEC BER value exceeding the second threshold and being below the first threshold, a signal to trigger traffic rerouting to a second transmission path to reduce traffic loss due to the degradation over the first transmission path, the pre-FEC BER value not included in the plurality of pre-FEC BER values.

2. The method of claim 1, wherein:
the set of parameters includes a soak time; and
the sending further includes sending the signal in response to the pre-FEC BER value exceeding the second threshold and being below the first threshold for a period of the soak time.

3. The method of claim 1, wherein the set of parameters includes a third threshold, the signal is a first signal, the method further comprising:
sending, in response to the pre-FEC BER value being below the third threshold, a second signal to stop the traffic rerouting after the first signal is sent.

4. The method of claim 1, wherein the set of parameters includes a third threshold, the signal is a first signal,
when the signal pattern is a high noise signal pattern, the method further comprising:
increasing, based on the high noise signal pattern, the third threshold from a first value to a second value; and
sending, in response to the pre-FEC BER value being below the second value of the third threshold, a second signal to stop the traffic rerouting after the first signal is sent.

5. The method of claim 1, further comprising:
when the signal pattern is a high noise signal pattern, increasing, based on the high noise signal pattern, the second threshold from a first value to a second value such that the signal is sent in response to the pre-FEC BER value exceeding the second value of the second threshold and being below the first threshold.

6. The method of claim 1, further comprising:
when the signal pattern is a bursty noise signal pattern, decreasing, based on the bursty noise signal pattern, the second threshold from a first value to a second value such that the signal is sent in response to the pre-FEC BER value exceeding the second value of the second threshold and being below the first threshold.

7. The method of claim 1, wherein the set of parameters includes a third threshold, the signal is a first signal,
when the signal pattern is a bursty noise signal pattern, the method further comprising:
decreasing, based on the bursty noise signal pattern, the third threshold from a first value to a second value; and
sending, in response to the pre-FEC BER value being below the second value of the third threshold, a second signal to stop the traffic rerouting after the first signal is sent.

8. The method of claim 1, further comprising:
adjusting the set of parameters based on a machine learning system.

9. The method of claim 1, wherein the set of parameters includes a hold-off time and a third threshold, the signal is a first signal,
the method further comprising:
sending, in response to the pre-FEC BER value being below the third threshold for a period of the hold-off time, a second signal to stop the traffic rerouting after the first signal is sent.

10. The method of claim 1, further comprising:
adjusting the set of parameters based on an average of the plurality of pre-FEC BER values and a standard deviation of the plurality of pre-FEC BER values.

11. The method of claim 1, further comprising:
determining an identity of at least one source device of the degradation,
adjusting the set of parameters based on the identity of the at least one source device of the degradation.

12. The method of claim 1, wherein:
the degradation is associated with a first optical link of a plurality of optical links over the first transmission path,
the signal is sent to trigger the traffic rerouting from the first optical link of the plurality of optical links to a second optical link of the plurality of optical links.

13. A non-transitory processor-readable medium storing code representing instructions to be executed by a processor, the code comprising code to cause the processor to:
receive, during a first time period, a plurality of pre-forward error correction (FEC) bit error rate (BER) values to identify a degradation over a transmission path that includes an optical transponder;
determine, based on the plurality of pre-FEC BER values, a signal pattern;
adjust, based on the signal pattern, a pre-FEC BER threshold from a first value to a second value; and
sending, in response to a pre-FEC BER value meeting a criteria associated the second value of the pre-FEC BER threshold indicating the degradation over the transmission path, a signal to trigger a traffic protection protocol such that traffic loss is reduced after the degradation, the pre-FEC BER value not included in the plurality of pre-FEC BER values.

14. The non-transitory processor-readable medium of claim 13, wherein the code to adjust includes code to cause the processor to:
when the signal pattern is a high noise signal pattern, increase the pre-FEC BER threshold from the first value to the second value such that false positive alarm signals are reduced.

15. The non-transitory processor-readable medium of claim 13, wherein the code to adjust includes code to cause the processor to:
when the signal pattern is a bursty noise signal pattern, decrease the pre-FEC BER threshold from the first value to the second value such that the degradation can be identified preemptively.

16. The non-transitory processor-readable medium of claim 13, wherein:
the pre-FEC BER threshold is a first pre-FEC BER threshold,
the signal is a first signal,
when the signal pattern is a high noise signal pattern, the code includes code to cause the processor to:
increase a second pre-FEC BER threshold from a third value to a fourth value, and
send, in response to the pre-FEC BER value being below the fourth value of the second pre-FEC BER threshold, a second signal to stop the traffic protection protocol after the first signal is sent.

17. The non-transitory processor-readable medium of claim 13, wherein:
the pre-FEC BER threshold is a first pre-FEC BER threshold,
the signal is a first signal,
when the signal pattern is a bursty noise signal pattern, the code includes code to cause the processor to:
decrease a second pre-FEC BER threshold from a third value to a fourth value, and
send, in response to the pre-FEC BER value being below the fourth value of the second pre-FEC BER threshold, a second signal to stop the traffic protection protocol after the first signal is sent.

18. The non-transitory processor-readable medium of claim 13, wherein the code to send includes code to cause the processor to:
send the signal in response to the pre-FEC BER value meeting the criteria associated with the second value of the pre-FEC BER threshold for a period of time.

19. The non-transitory processor-readable medium of claim 13, further comprises code to cause the processor to:
adjust the pre-FEC BER threshold based on a machine learning system.

20. A non-transitory processor-readable medium storing code representing instructions to be executed by a processor, the code comprising code to cause the processor to:
receive, at a first time, a plurality of pre-forward error correction (FEC) bit error rate (BER) values;
determine, based on the plurality of pre-FEC BER values, a signal pattern;
adjust, based on the signal pattern, a pre-FEC BER threshold from a first threshold value to a second threshold value;
receive, at a second time after the first time, a first pre-FEC BER value;
in response to the first pre-FEC BER value meeting a first criteria associated with the first threshold value and not meeting a second criteria associated with the second threshold value, not send an alarm signal to trigger a traffic protection protocol;

receive, at a third time after the first time, a second pre-FEC BER value;

in response to the second pre-FEC BER value meeting the second criteria associated with the second threshold value indicating a signal degradation over a transmission path, send the alarm signal to trigger a traffic protection protocol such that traffic loss due to the signal degradation is reduced.

\* \* \* \* \*